United States Patent [19]
Wolfe, Jr.

[11] 3,890,279
[45] June 17, 1975

[54] THERMOPLASTIC COPOLYESTER ELASTOMER

[75] Inventor: James Richard Wolfe, Jr., Wilmington, Del.

[73] Assignee: E. I. du Pont de Nemours & Co., Wilmington, Del.

[22] Filed: Dec. 10, 1973

[21] Appl. No.: 423,017

[52] U.S. Cl. ......... 260/75 R; 260/40 R; 260/45.9 R; 260/75 S
[51] Int. Cl. ............................................. C08g 17/08
[58] Field of Search .......................... 260/75 R, 860

[56] References Cited
UNITED STATES PATENTS

| | | | |
|---|---|---|---|
| 3,542,737 | 11/1970 | Keck et al. | 260/75 R |
| 3,651,014 | 3/1972 | Witsiepe | 260/75 R |
| 3,682,863 | 8/1972 | McHale | 260/75 R |

*Primary Examiner*—Melvin Goldstein
*Assistant Examiner*—W. C. Danison, Jr.

[57] ABSTRACT

A thermoplastic copolyester elastomer containing recurring ester units of at least two types. One type ester unit is derived from symmetrical aromatic dicarboxylic acids and 1,4-butanediol. The copolyester contains about 30–95 percent by weight of this type of ester unit. About 5 to 70 percent by weight are ester units of the second type having side chains having a length between 7 and 30 carbon atoms. The second type of ester units are derived from diols and/or dicarboxylic acids having at least one side chain of 7 to about 30 carbon atoms in length.

9 Claims, No Drawings

THERMOPLASTIC COPOLYESTER ELASTOMER

BACKGROUND OF THE INVENTION

Linear thermoplastic copolyetheresters having elastomeric properties have been suggested heretofore for a variety of uses, particularly for the production of films and fibers. Most of the known polymers of this type are not suitable for particular applications such as, for example, high pressure hose where high tear strength and good flexibility are required and high temperature hose where a rapid crystallization rate, superior oxidation resistance and good tear strength are needed. Thus there is a need for a thermoplastic copolymer which has outstanding characteristics with regard to crystallization rate, tear strength, flexibility and in certain high temperature applications superior oxidation resistance.

SUMMARY OF THE INVENTION

According to this invention there is provided a thermoplastic copolyester which possesses these desired combinations of properties.

The copolyester, itself, is a thermoplastic polymer consisting essentially of a multiplicity of recurring ester units of which there are at least two types, connected head-to-tail through ester linkages. The ester units are represented by the following structure:

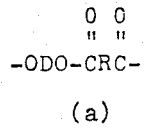

(a)

in conjunction with at least one of the following structures:

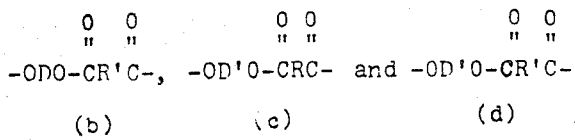

wherein:

R is a divalent radical remaining after removal of carboxyl groups from a symmetrical aromatic dicarboxylic acid having a molecular weight less than about 300;

R' is a divalent radical remaining after removal of carboxyl groups from a dicarboxylic acid having attached to it at least one side chain having a length of 7 to about 30 carbon atoms; said dicarboxylic acid R' having a molecular weight of less than about 300 neglecting the side chains;

D is a divalent radical remaining after removal of hydroxyl groups from 1,4-butanediol; and D' is a divalent radical remaining after removal of hydroxyl groups from a low molecular weight diol having at least one side chain having a length of about 7 to about 30 carbon atoms, and D' having a molecular weight of less than about 250 neglecting the side chains.

Ester units with side chains make up about 5 to 70 percent by weight of the total polymer. About 30 to 95 percent by weight of the polymer is made up of units having no long side chains which are derived from 1,4-butanediol and a symmetrical aromatic dicarboxylic acid.

DETAILED DESCRIPTION

The term "ester units" as applied to units in the polymer chain refers to relatively low molecular weight units neglecting the molecular weight contribution of the side chains. They are prepared by reacting 1,4-butanediol and optionally a low molecular weight diol having a side chain with a symmetrical aromatic dicarboxylic acid having a molecular weight below about 300 and optionally a dicarboxylic acid having a side chain to form ester units represented by the formulae (a), (b), (c) and (d) above. At least two different types of short chain ester units must be utilized. One unit represented by formula (a) above contains no side chains. The other units are at least one of the units represented by the formulae (b), (c) and (d) above.

Regarding the low molecular weight diols which react to form the short chain ester units containing the side chains (formulae (c) and (d)) which are at least 7 to 30 carbon atoms in length and preferably 7 to 25 carbon atoms in length, the diols which are utilized should have a molecular weight of less than about 250 excluding the contribution to molecular weight provided by the side chain. The side chains can be aliphatic or cycloaliphatic; they can contain one or more oxygen atoms as an additional element but at least 2 carbon atoms must be present between oxygens; they can contain benzene rings, they can contain one or more double bonds, they can be straight chain or branched and finally compounds derived by removing the side chain from the diol and replacing the free bond of the chain with a hydrogen atom should have a melting point of less than 100°C. In determining the chain length of branched chains, the longest chain should be utilized. When the chain contains cycloaliphatic or aromatic rings, the number of carbons in the shortest path along the chain should be utilized; e.g., 1,2-cyclo-derivatives contribute two carbon atoms.

Representative diols having side chains include any of the diols commonly used to prepare polyesters when properly substituted with one or more side chains.

Specific examples of suitable long chain diols include 3-octadecyloxy-1,2-propanediol, dodecanediol-1,2,3-octadec-9-enyloxy-1,2-propanediol, N,N-bis(2-hydroxyethyl)stearamide, 3-octylhexanediol-1,6, 2-tetradecyl-1,3-propanediol, 2-ethyl-2-(1-dodecenyloxy) propanediol-1,3, 2-n-octadecylbutanediol-1,4 and 2,3-dihexadecylbutanediol-1,4.

Dicarboxylic acids without side chains which are reacted with 1,4-butanediol and optionally the foregoing diols to produce copolyesters of this invention are symmetrical aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300.

Symmetrical aromatic dicarboxylic acids which can be used include terephthalic acid, 4,4'-dibenzoic acid, 4,4'-substituted dicarboxy compounds with two benzene nuclei such as bis(p-carboxyphenyl)methane, p-oxy(p-carboxyphenyl) benzoic acid, ethylene-bis(p-oxybenzoic acid), 1,5-naphthalene dicarboxylic acid, 2,6-naphthalene dicarboxylic acid, 4,4'-sulfonyl dibenzoic acid, and symmetrically substituted derivatives thereof, with substituents such as $C_1$–$C_4$-alkyl, halo and alkoxy groups. Preferred symmetrical aromatic dicarboxylic acids are terephthalic acid and 2,6-naphthalene dicarboxylic acid. As mentioned previously the esters of dicarboxylic acids and in particular their dimethylesters are included within the scope of the term dicarboxylic acid.

Dicarboxylic acids may also be used which have at least one side chain extending from them. The side chains present in the acid must have the same characteristics as those described hereinbefore for the low molecular weight diols having side chains. Any of the common aliphatic, cycloaliphatic or aromatic dicarboxylic acids may be utilized when properly substituted with the above-mentioned side chains. The molecular weight of the dicarboxylic acid should, however, not be above about 300 excluding the contribution of the side chain.

Specific examples of suitable long chain acids include substituted succinic acids having alkyl or alkenyl radicals of 8–22 carbon atoms in the $\alpha$-position, 2-(1-dodecyloxy) terephthalic acid, 2-octyl adipic acid, octadecylmalonic acid, 2-decyl-3-tridecyl succinic acid, 3-decyl-phthalic acid and 1-dodecyl-1,2-cyclohexane dicarboxylic acid.

A preferred class of dicarboxylic acids having side chains are $\alpha$-substituted succinic acids which may be used as the diacid, the anhydride or diester. The $\alpha$-substituents are alkyl or alkenyl radicals containing from 8 to 22 carbon atoms.

The most preferred copolyetheresters of the instant invention are those prepared from 1,4-butanediol, terephthalic acid and a diol or dicarboxylic acid having an aliphatic side chain length of 7 to 25 carbon atoms. A preferred class of dicarboxylic acid is the $\alpha$-alkyl or $\alpha$-alkenyl succinic acids as previously mentioned.

When it is desired that the copolyesters have especially outstanding resistance to thermal and oxidative degradation, a diol or dicarboxylic acid with a saturated hydrocarbon side chain should be used.

The dicarboxylic acids or their derivatives are incorporated into the final product in the same molar proportions as are present in the reaction mixture. The amount of butanediol and side chain diol actually incorporated corresponds to the moles of diacid present in the reaction mixture. When a mixture of diols is employed, the amount of each diol incorporated is largely a function of the amounts of the diols present, their boiling points, and relative reactivities. Low molecular weight diols with side chains often are sufficiently high boiling that they are incorporated in amounts approaching those initially introduced into the reaction mixture.

The polymers described herein can be made conveniently by a conventional ester interchange reaction.

A preferred procedure involves heating the dimethylester of terephthalic acid with a molar excess of a diol in the presence of a catalyst at about 150°–260°C. and a pressure of 0.5 to 5 atmospheres, preferably ambient pressure, while distilling off methanol formed by the ester interchange. In addition, suitable amounts of a diester having side chains and/or a diol having side chains must be present. Depending on temperature, catalyst, glycol excess, and equipment, this reaction can be completed within a few minutes, e.g., 2 minutes to a few hours, e.g., 2 hours.

Concerning the molar ratio of reactants, at least about 1.1 mole of diol should be present for each mole of acid, preferably at least about 1.25 mole of diol for each mole of acid. The side chain-bearing intermediates should be present in amounts corresponding to the composition limits previously set out hereinbefore.

This procedure results in the preparation of a low molecular weight prepolymer which can be carried to the high molecular weight copolyester of this invention by the procedure described below. The copolymer can be prepared by ester interchange from either the dimethyl esters and low molecular weight diols, as above, or from the free acids with the diol acetates. Alternatively, the copolymer can be prepared by direct esterification from appropriate acids, anhydrides, or acid chlorides, for example, with diols or by other processes such as reaction of the acids with cyclic ethers or carbonates.

The resulting prepolymer is then carried to high molecular weight by distillation of the excess of diol. This process is known as "polycondensation."

Additional ester interchange occurs during this polycondensation which serves to increase the molecular weight and to randomize the arrangement of the copolyester units. Best results are usually obtained if this final distillation or polycondensation is run at less than about 5mm. pressure and about 200°–270°C. for less than about 5 hours, e.g., 1 to 4 hours. It is preferred that a stabilizer such as 4,4'-bis($\alpha,\alpha$-dimethylbenzyl)diphenylamine be present during the polycondensation preferably in the amount of about 0.05 to 2.0 percent by weight, but this is not essential.

Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be employed, organic titanates such as tetrabutyl titanate used alone or in combination with magnesium or calcium acetates are preferred. Complex titanates, such as $MG[HTi(OR)_6]_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

The catalyst should be present in the amount of 0.005 to 0.2 percent by weight based on total reactants.

Ester interchange polymerizations are generally run in the melt without added solvent, but inert solvents can be used to facilitate removal of volatile components from the mass at low temperatures. This technique is especially valuable during prepolymer preparation, for example, by direct esterification. Both batch and continuous methods can be used for any stage of copolyester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

A stabilizer if used may be added at any time during the preparation of the copolyester. It is preferred that a stabilizer be present during the polycondensation aspect of the reaction in an amount of at least about 0.05 percent by weight based on the estimated yield of copolyetherester product, preferably in an amount of 0.05 to 2.0 percent by weight.

Stabilizers which may be utilized include 1,3,5-tris-(3,5-di-tert-butyl-4-hydroxyhydrocinnamoyl)-hexahydro-S-triazine and 4,4'-bis($\alpha,\alpha$-dimethylbenzyl)diphenylamine.

It is essential to the instant invention that there be at least two types of diols, one being 1,4-butanediol and/or at least two types of dicarboxylic acids one being a symmetrical aromatic dicarboxylic acid in the backbone distributed randomly throughout the polymer.

When the polymer is prepared with a single dicarboxylic acid, butanediol and a diol bearing side chains, ester units corresponding to (a) and (c) will be present.

When two acids, one bearing side chains, and only butanediol are used, ester units (a) and (b) will be present.

When two acids and two diols, one of each pair bearing side chains are used, ester units (a), (b), (c) and (d) will be present.

For purposes of determining the number of ester units bearing side chains it is assumed that all species are of equal reactivity and the various units are present in statistical amounts. For example, polymers containing equimolar amounts of low molecular diols, one with and one without side chains, would be assumed to contain with regard to total number of ester units, 50 percent of ester units with side chains. The same is true for a mixture of two dicarboxylic acids with one diol. In the situation where the polymers contain units derived from 3 moles of dicarboxylic acid without a side chain, 1 mole of acid with a side chain, 3 moles of diol without a side chain and 1 mole of diol with a side chain, it would be assumed that the polymer contained with regard to the total number of ester units, about 44 percent ester units with side chains of which about 6 percent would be derived from both side chain-bearing acid and diol.

The properties of these copolyesters can also be modified by incorporation of various conventional inorganic fillers such as carbon black, silica gel, alumina, clays and chopped fiber glass. In general, these additives have the effect of increasing the modulus of the material at various elongations. Compounds having a range of hardness values can be obtained by blending hard and soft copolyetheresters of this invention.

All parts, proportions and percentages disclosed herein are by weight unless otherwise indicated.

The following examples further illustrate the invention:

EXAMPLES

The following ASTM methods are employed in determining the properties of the polymers prepared in the Examples which follow:

| | |
|---|---|
| Modulus at 100% elongation*, $M_{100}$ | D412 |
| Modulus at 300% elongation*, $M_{300}$ | D412 |
| Tensile at Break*, $T_B$ | D412 |
| Elongation at Break*, $E_B$ | D412 |
| Hardness, Shore D | D1484 |
| Tear Strength** | D470 |
| Clash-Berg Torsional Stiffness | D1043 |

*Cross-head speed 2"/minute if not stated otherwise.
**Modified by use of 1.5" × 3" sample with 1.5" cut on the long axis of the sample. This configuration prevents "necking down" at the point of tearing. A cross-head speed of 50"/min. is used.

Inherent viscosities of the polymers in the following examples are measured at 30°C. at a concentration of 0.1g./dl. in m-cresol.

Polymer melting points are determined by means of a differential scanning calorimeter.

EXAMPLE 1

The following materials are placed in a 400 ml reaction kettle fitted for distillation:

| | |
|---|---|
| 2-Docosenylsuccinic anhydride | 19.9 gm |
| 1,4-Butanediol | 26.0 gm |
| Dimethyl terephthalate | 27.8 gm |
| 4,4'-Bis($\alpha,\alpha$-dimethylbenzyl)-diphenyl amine | 0.55 gm |

A stainless steel stirrer with a paddle cut to conform with the internal radius of the flask bottom and with a circular baffle one-half inch less in diameter than the inside of the flask is positioned with the paddle at the bottom of the flask and the baffle about 2½ inches above the bottom of the flask. Air in the flask is replaced with nitrogen. The flask is placed in an oil bath heated to a temperature of 160°C. After the reaction mixture liquefies, 0.36 ml of catalyst solution is added. Agitation is initiated. Methanol distills from the reaction mixture as the temperature of the oil bath is raised to 255° ± 5° over a period of about 35–50 minutes. When the temperature reaches 255° ± 5°C., the pressure in the flask is gradually reduced to 0.1 mm of Hg or less over a period of about 40 minutes. The polymerization mass is stirred at 255°±5°C. at less than 0.1 mm of Hg until the viscosity of the reaction mixture no longer increases. This usually requires about 1–4 hours. The resulting viscous molten product is scraped from the flask in a nitrogen (water and oxygen free) atmosphere and allowed to cool. From the ratios of starting materials the copolymer is calculated to have the composition 57.4%(wt)tetramethylene terephthalate/42.6-%tetramethylene 2-docosenylsuccinate. Physical properties are obtained on copolymer samples compression-molded at about 230°C. Properties are listed in the following Table as Polymer A.

The catalyst solution employed in this Example is prepared as follows:

Magnesium diacetate tetrahydrate is dried for 24 hours at 150°C under vacuum with a nitrogen bleed. A mixture of 11.2 gm of the dried magnesium diacetate and 200 ml of methanol is heated at reflux for 2 hours. The mixture is allowed to cool and 44.4 ml of tetrabutyl titanate and 150 ml of 1,4-butanediol are added with stirring.

EXAMPLE 2

The copolymerization is carried out in a manner similar to that of Example 1 using the following materials:

| | | | | |
|---|---|---|---|---|
| Branched dodecenylsuccinic anhydride | | | | 316 gm |
| 1,4-Butanediol | | | | 546 gm |
| Dimethyl terephthalate | | | | 554 gm |
| 4,4'-bis(α,α-dimethylbenzyl)-diphenyl amine | | | | 10 gm |

The polymerization is carried out in a 5L kettle. The baffle on the stirrer shaft is placed about half of the way up from the bottom to the top of the kettle. Twenty ml of a catalyst solution prepared by mixing for 2 hours at 50°C. under nitrogen 223.7 gm of tetrabutyl titanate with 4,250 gm of 1,4-butanediol is used instead of the catalyst solution of Example 1.

From the ratios of starting materials the copolymer is calculated to have the composition 61%(wt)tetramethylene terephthalate/39%tetramethylene branched dodecenylsuccinate. Physical properties are obtained on copolymer samples compression-molded at about 230°C. Properties are listed in the following Table as Polymer B.

EXAMPLE 3

The copolymerization is carried out in a manner similar to that of Example 1 using the following materials:

| | |
|---|---|
| Iso-octadecenylsuccinic anhydride | 6.8 gm |
| 1,4-Butanediol | 31.3 gm |
| Dimethyl terephthalate | 41.2 gm |
| 4,4'-bis(α,α-dimethylbenzyl)-diphenyl amine | 0.55 gm |
| Catalyst solution of Example 1 | 0.36 ml |

From the ratios of starting materials the copolymer is calculated to have the composition 85%(wt)tetramethylene terephthalate/15%tetramethylene iso-octadecenylsuccinate. Physical properties are obtained on copolymer samples compression-molded at about 249°C. Properties are listed in the following Table as Polymer C.

EXAMPLE 4

The copolymerization is carried out in a manner similar to that of Example 1 using the following materials:

| | |
|---|---|
| Octadecylsuccinic anhydride | 19.4 gm |
| 1,4-Butanediol | 23.2 gm |
| Dimethyl 2,6-naphthalenedicarboxylate | 28.5 gm |
| 4,4'-bis(α,α-dimethylbenzyl)-diphenyl amine | 0.55 gm |
| Catalyst solution of Example 1 | 0.36 ml |

From the ratios of starting materials the copolymer is calculated to have the composition 57.4%(wt)tetramethylene 2.6-naphthalenedicarboxylate/42.6%tetramethylene octadecylsuccinate. Physical properties are obtained on copolymer samples compression-molded at about 232°C. Properties are listed in the following Table as Polymer D.

TABLE

| Polymer | A | B | C | D |
|---|---|---|---|---|
| Inherent viscosity | 1.0 | 0.7 | 1.1 | 1.1 |
| $M_{100}$ (psi) | 1300 | 1890 | 3650 | 1120 |
| $M_{300}$ (psi) | 1680 | 2000 | 3900 | 1790 |
| $T_B$ (psi) | 5600 | 4800 | 8550 | 5500 |
| $E_B$ (%) | 620 | 540 | 410 | 580 |
| Shore D hardness | 45 | 60 | 77 | 43 |
| Tear strength, 50 in/min | | | | |
| (pli) | 710 | 680 | 610 | 655 |
| DSC m.p. (°C.) | 171 | 167 | 212 | 165,232* |
| Clash Berg, $T_{10000}$ (°C.) | 12 | 20 | >25 | 10 |

*Two melting points observed.

EXAMPLE 5

A copolyester having a calculated composition of 74%(wt)tetramethylene terephthalate/26%tetramethylene octadecylsuccinate is prepared in a manner similar to that of Example 2. The polymer is compression-molded at about 249°C. into a slab of thickness about 75 mils. Dumbbell shaped specimens of length 4½ inches are died out for use in tube aging tests at 177°C.

Dumbbell shaped specimens of a copolyetherester polymer of similar hardness (64 Shore D) are prepared for comparison purposes. The copolyetherester polymer which is outside the scope of this invention is prepared from dimethyl terephthalate, dimethyl phthalate, polytetramethylene ether glycol (avg. mol. wt. 1,000) and excess 1,4-butanediol. It has the composition 70%(wt)tetramethylene terephthalate/7% tetramethylene phthalate/21%poly(tetramethylene ether-1,000 mol. wt)terephthalate/2% poly(tetramethylene ether-1,000 mol. wt)phthalate. Both the copolyester and the copolyetherester polymer contain 1%(wt) of 4,4'-bis(α,α-dimethylbenzyl)diphenyl amine antioxidant.

The polymer dumbbells are heat aged in tubes in which air is allowed to circulate at 177° ± 1°C. When tested for flexibility after 48 hours of heat aging by bending the polymer dumbbells previously cooled to room temperature so that the dumbbell ends touched, the copolyetherester dumbbells snapped in two. The copolyester dumbbells were still flexible and remained flexible even after 7 days at 177°C., suffering no breakage when bent end-to-end.

What is claimed is:

1. A thermoplastic copolyester elastomer consisting essentially of a multiplicity of recurring ester units joined head-to-tail through ester linkages, said ester units being represented by the formula:

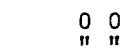

(a)

and at least one other formula selected from the group consisting of:

wherein:

R is a divalent radical remaining after removal of carboxyl groups from a symmetrical aromatic dicarboxylic acid having a molecular weight less than about 300;

R' is a divalent radical, containing at least one side chain of 7 to about 30 carbon atoms in length, remaining after removal of carboxyl groups from a dicarboxylic acid having a molecular weight of less than about 300 neglecting the side chains;

D is a divalent radical remaining after removal of hydroxyl groups from 1,4-butanediol; and D' is a divalent radical, having at least one side chain of 7 to about 30 carbon atoms in length, remaining after removal of hydroxyl groups from a diol having a molecular weight of less than about 250 neglecting the side chains; provided, said ester units corresponding to formula (a) amount to about 30 to 95 percent by weight of said copolyester and said ester units corresponding to formulae (b), (c) and (d) amount to a total of about 5 to 70 percent by weight of said copolyester.

2. The composition of claim 1 wherein the branched short chain ester units are represented by the formula (b) and the side chain or chains are aliphatic or cycloaliphatic.

3. The composition of claim 2 wherein there is a single side chain of 7 to 25 carbon atoms in length.

4. The composition of claim 1 wherein R is derived from terephthalic acid or 2,6-naphthalene dicarboxylic acid or their dimethylesters.

5. The composition of claim 1 wherein R' is derived from an $\alpha$-substituted succinic acid.

6. The composition of claim 5 wherein the $\alpha$-substituents are alkyl or alkenyl radicals containing from 8 to 22 carbon atoms.

7. The composition of claim 1 wherein said copolyester is formed from 1,4-butanediol, terephthalic acid or its dimethylester and a substituted succinic acid having an $\alpha$-alkyl or $\alpha$-alkenyl radical containing from 8 to 22 carbon atoms.

8. The composition of claim 7 wherein the $\alpha$-alkyl or $\alpha$-alkenyl radical is selected from dodecyl or dodecenyl radicals.

9. The composition of claim 1 wherein the side chain is a saturated hydrocarbon.

* * * * *